United States Patent
Chapman

(10) Patent No.: US 6,572,059 B1
(45) Date of Patent: Jun. 3, 2003

(54) CAMERA PEDESTAL

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 10/035,927

(22) Filed: Dec. 24, 2001

(51) Int. Cl.$^7$ .................................................. A47K 1/04
(52) U.S. Cl. ........................ 248/129; 248/161; 248/404; 280/47.11
(58) Field of Search ................................. 248/404, 129, 248/125.1, 125.8, 188.2, 188.5, 161, 187.1, 157, 422, 429, 407; 280/47.11, 47.41, 870.21

(56) References Cited

U.S. PATENT DOCUMENTS

| | | | | |
|---|---|---|---|---|
| 2,518,288 A | * | 8/1950 | Coutant | 280/47.11 |
| 2,719,043 A | * | 9/1955 | Oppenheimer | 16/21 |
| 3,682,424 A | * | 8/1972 | Strumpell | 248/565 |
| 3,829,063 A | * | 8/1974 | Holzworth | 254/2 R |
| 5,318,313 A | * | 6/1994 | Chapman | 248/129 |
| 5,516,070 A | * | 5/1996 | Chapman | 248/404 |
| 5,716,062 A | * | 2/1998 | Lindsay | 280/47.11 |
| 6,050,575 A | * | 4/2000 | Lindsay | 280/47.11 |
| 6,073,903 A | * | 6/2000 | Lindsay | 248/404 |

* cited by examiner

Primary Examiner—Leslie A. Braun
Assistant Examiner—Tan Le
(74) Attorney, Agent, or Firm—Perkins Coie LLP

(57) ABSTRACT

A camera pedestal has a column attachable to a base. The base includes a base plate, side plates and a cover. The base and side plates are flat and are bolted together to facilitate manufacture. A cable guard system on the base has separate guard plates which can be independently shifted up and down quickly and easily by hand. A drag assembly sets a holding force on the guard plates. The guard plates have greater ground clearance at the ends away from the corners of the pedestal, to avoid contact with high points on an undulating or uneven ground surface.

23 Claims, 12 Drawing Sheets

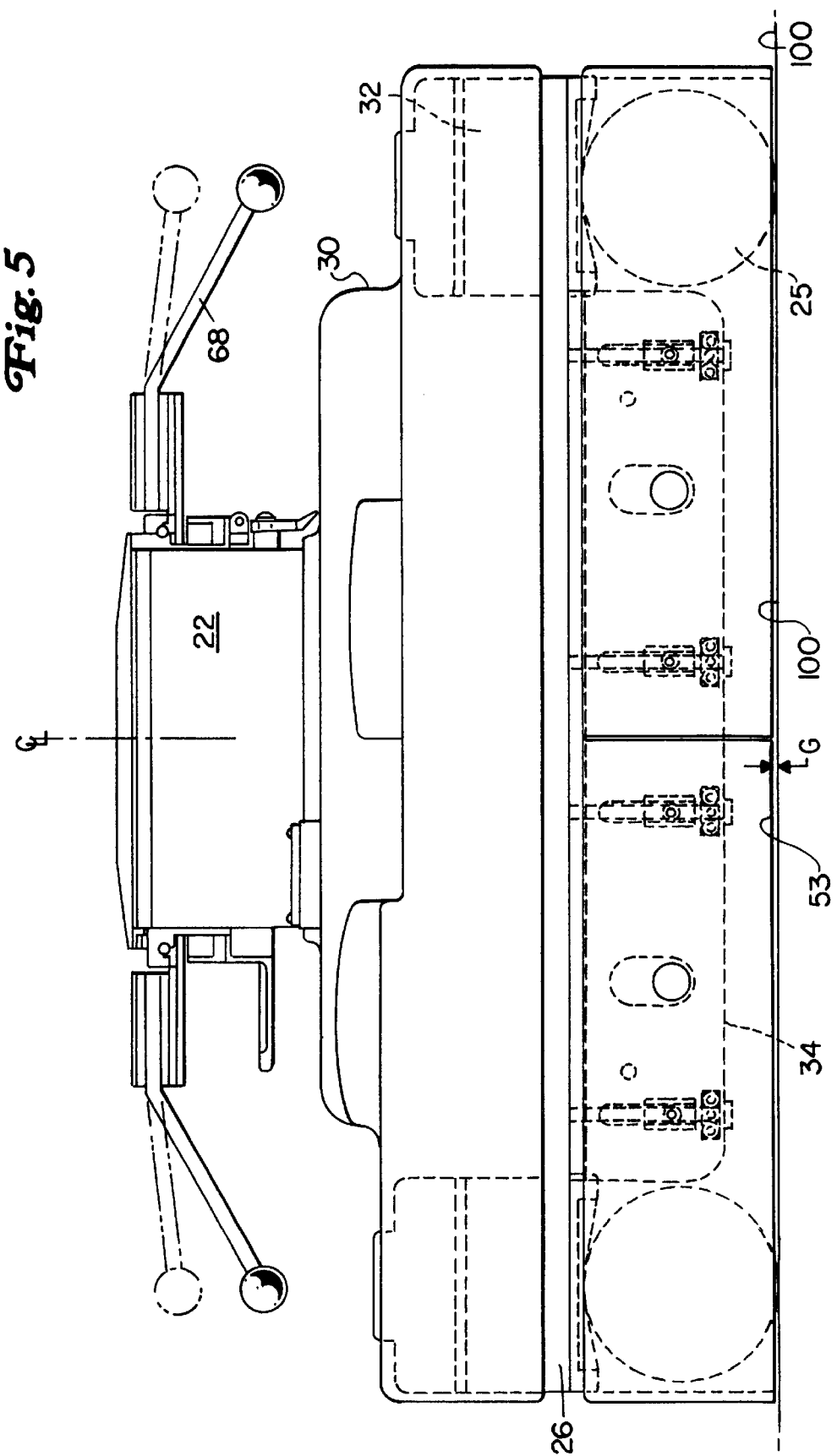

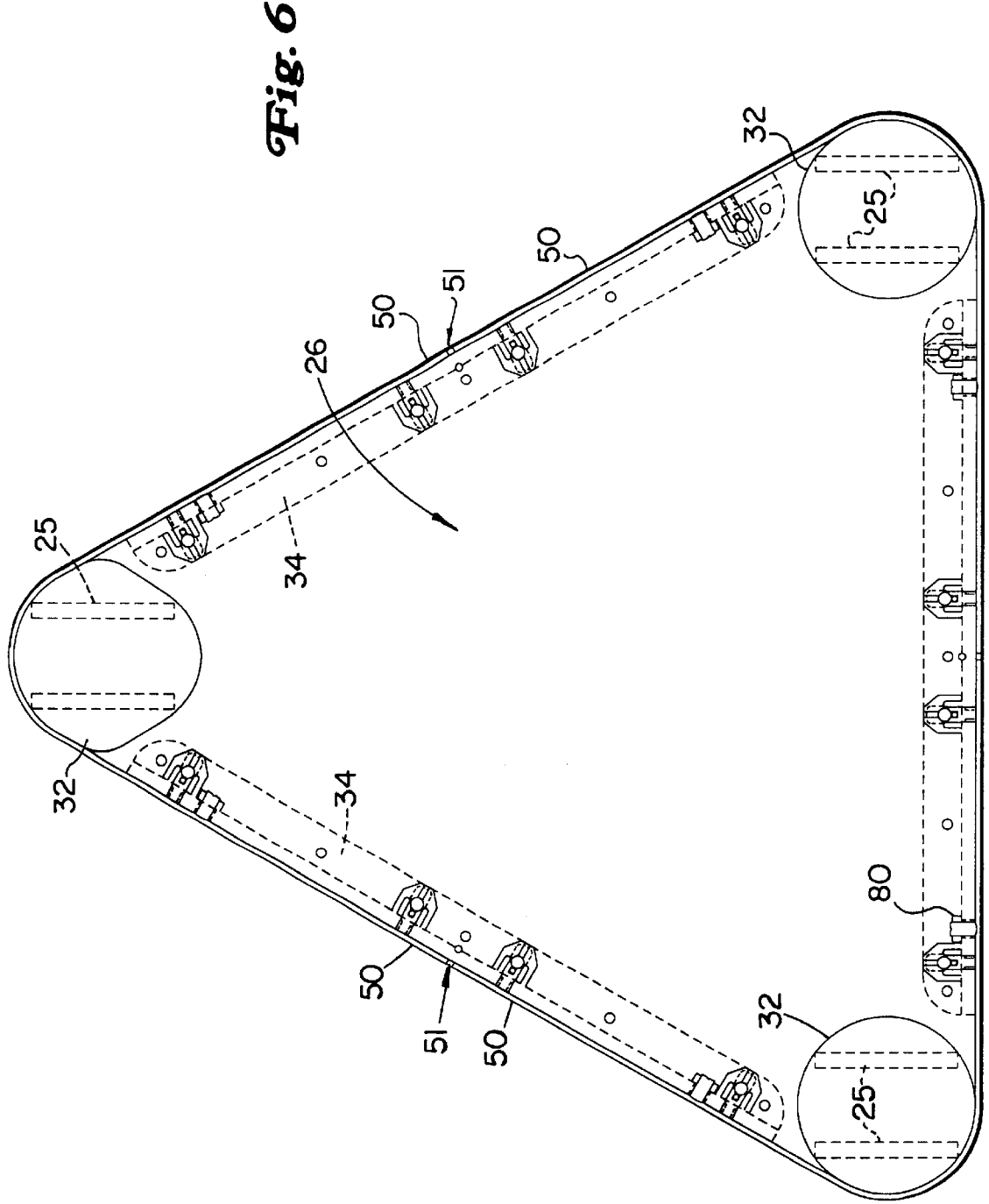

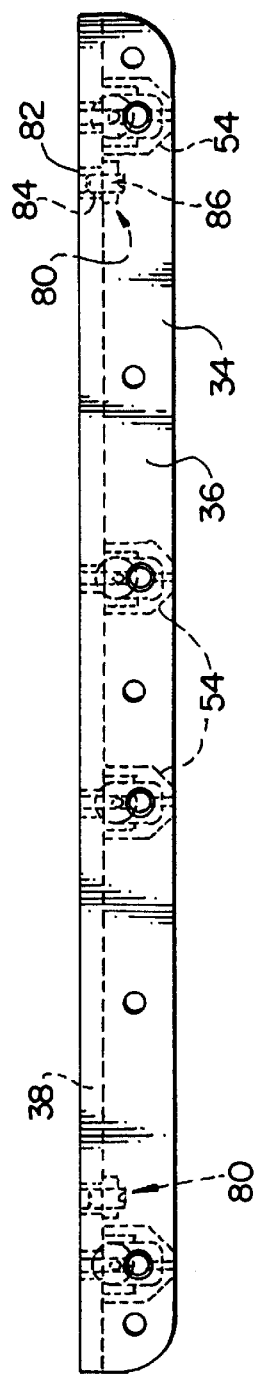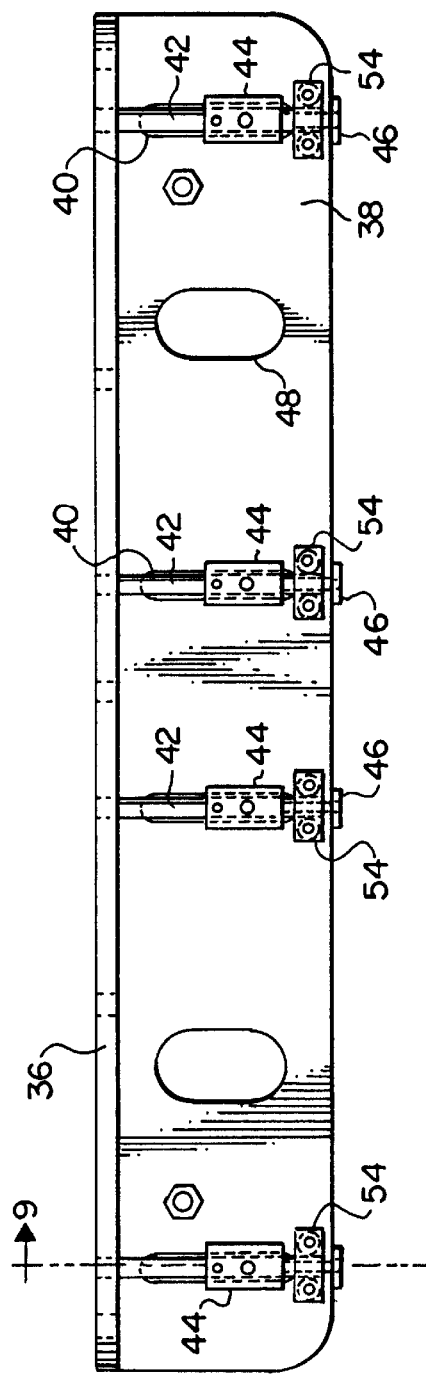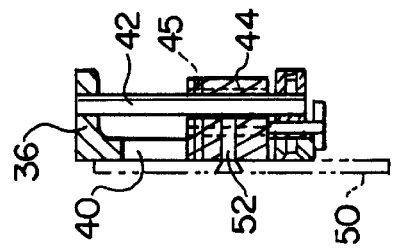

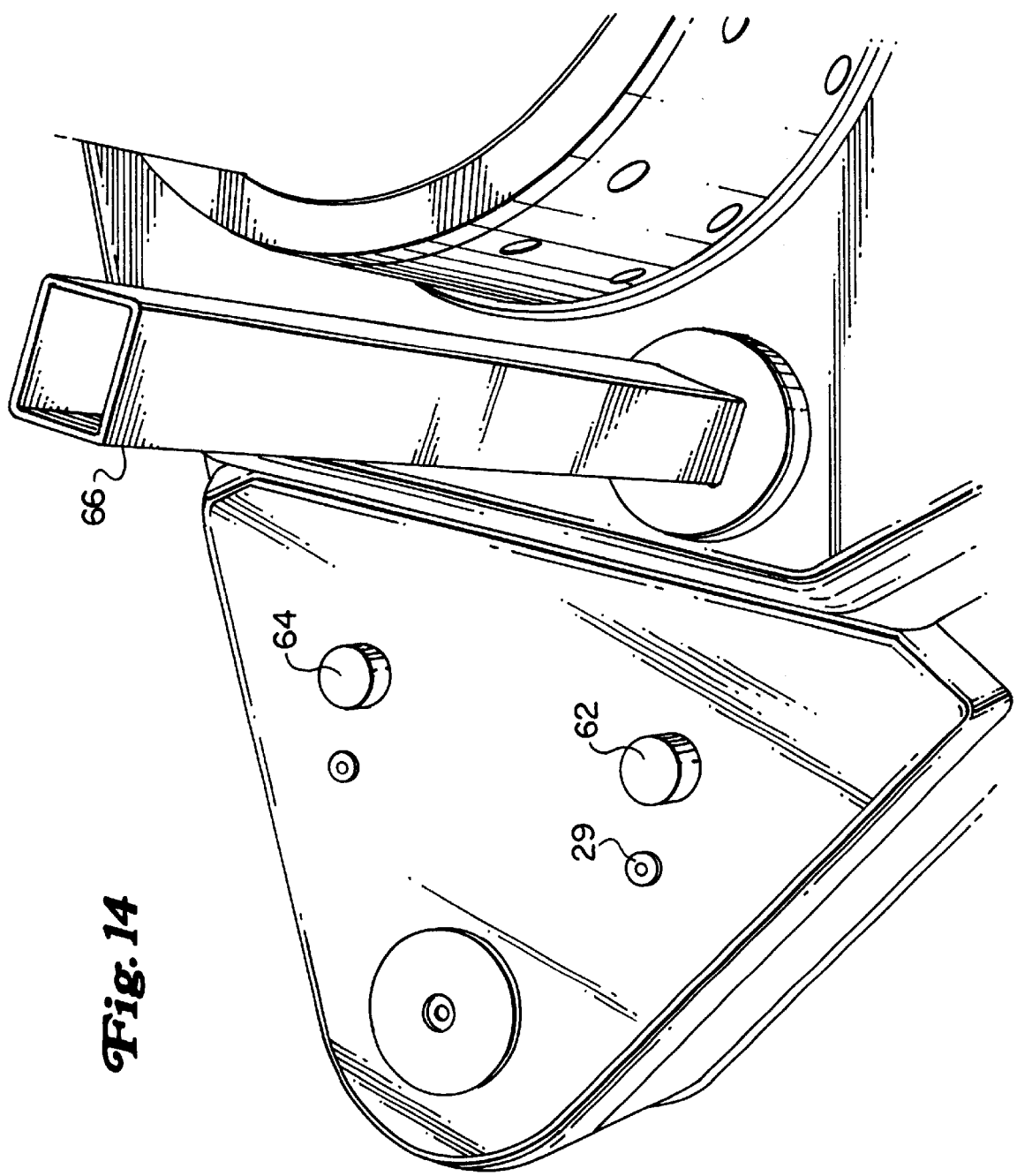

CAMERA PEDESTAL

BACKGROUND OF THE INVENTION

The field of the invention is camera pedestals. Camera pedestals are used in production of motion pictures, video and television programs. They are most widely used in the production of television programs, in television studios. The pedestal supports the television camera. Most pedestals used in television have a telescoping column for raising and lowering the camera. Generally, they are also on wheels, so that the camera can be moved about as needed by the camera operator.

To avoid interfering with the television sound tracks, operation of all aspects of the pedestal must be very quiet. In addition, since the camera and pedestal are typically operated by a single camera operator, the pedestal should be easily operated with conveniently located controls.

Generally, various cables connect the camera on the pedestal to other equipment in the studio or sound stage. As the pedestal is moved about by the camera operator, the cables are dragged or pulled along the floor behind or along side of the pedestal. Other cables, for sound, lighting, power, etc. are usually also on the floor, and occasionally may be in the path of the camera pedestal. To prevent cables (or other obstacles) from interfering with smooth movement of the pedestal, various cable guards have been used on pedestals. While these cable guards have met with varying degrees of success, there remains a need for a pedestal having an improved cable guard, which can be quickly, easily, and quietly operated.

In the past, camera pedestals used in television studios have often been mechanically complicated, as well as costly and time consuming to manufacture and maintain. Accordingly, there remains a need for camera pedestal which can be more easily manufactured, maintained, and serviced.

SUMMARY OF THE INVENTION

To these ends, in a first aspect, a camera pedestal includes wheels attached to a base. The base preferably is a flat plate, for ease of manufacture and servicing. A telescoping column is supported on the base and has a camera platform moveable in a vertical direction. Cable guard plates on the base are slidable along guide posts in a vertical direction from an up position providing maximum ground clearance, to a down position, for increased effectiveness in preventing obstacles from interfering with the wheels.

The base is preferably triangular with a wheel or wheel pair at each corner base. The cable guard plates are advantageously, slidably attached to side plates attached perpendicularly to the base. A steering system is provided on the top side of the base. This allows all servicing and adjusting to be performed without the need for accessing the bottom side of the pedestal. The camera pedestal of the invention preferably, but not necessarily, has each of these features. Of course, each of the features may also be used separately, within the scope of the invention. The invention resides as well in sub-combinations of the features described.

BRIEF DESCRIPTION OF THE DRAWINGS

FIG. 5 is a side elevation view of the pedestal shown in FIG. 1, with the column collapsed down, and with the cable guard system in the down position.

FIG. 6 is a partial plan view of the base shown in FIG. 2, with the various components omitted for purpose of illustration.

FIG. 7 is a side elevation view of one of the side plates shown in FIGS. 3, with all three side plates preferably identical.

FIG. 8 is top view thereof.

FIG. 9 is a section view thereof taken along line 9—9 of FIG. 7.

FIG. 14 is a top view of the back corner of the base of the pedestal shown in FIG. 1.

DETAILED DESCRIPTION OF THE DRAWINGS

Figure 1:
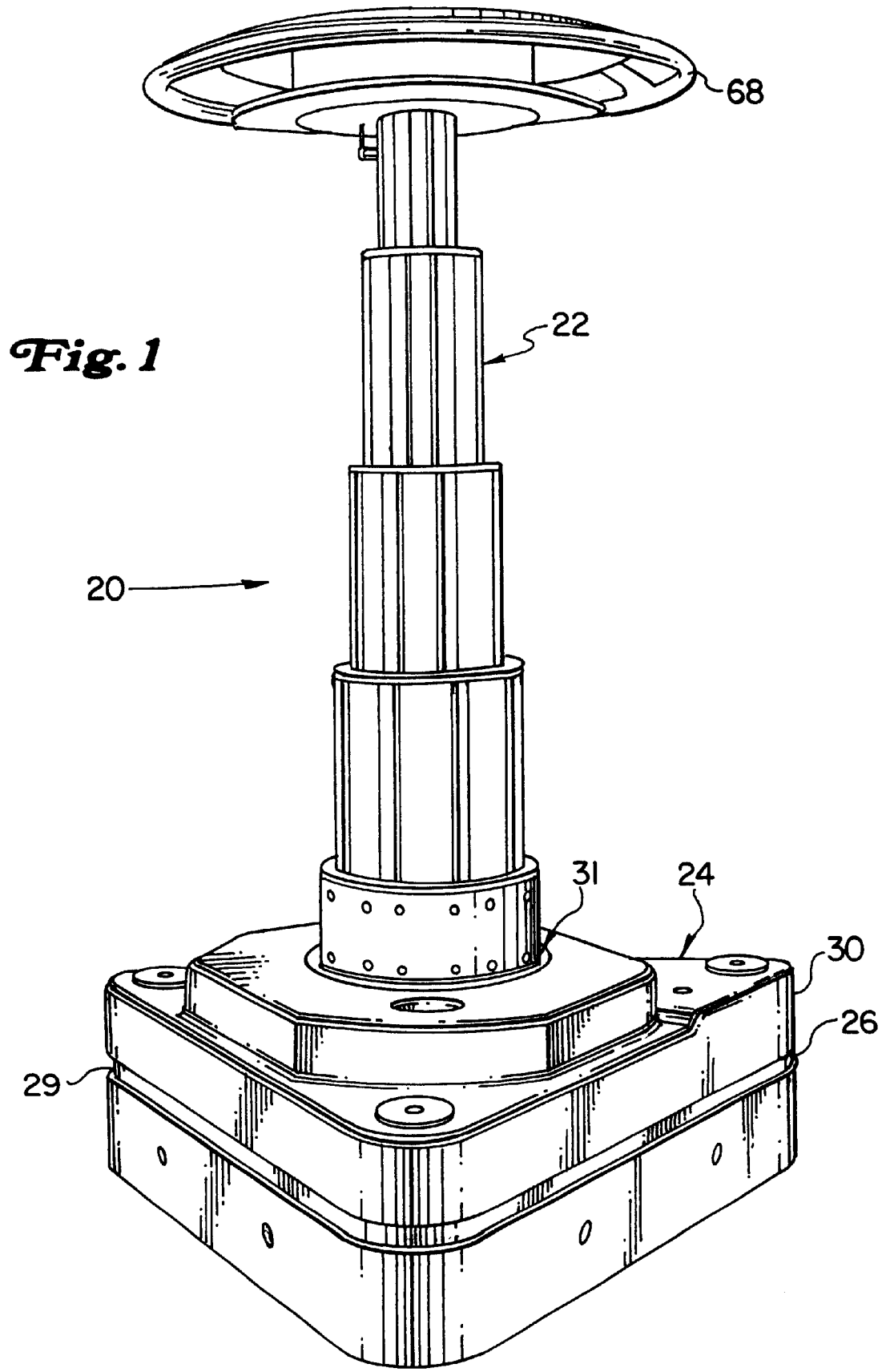
FIG. 1 is a perspective view of the present camera pedestal.
Figure 2:
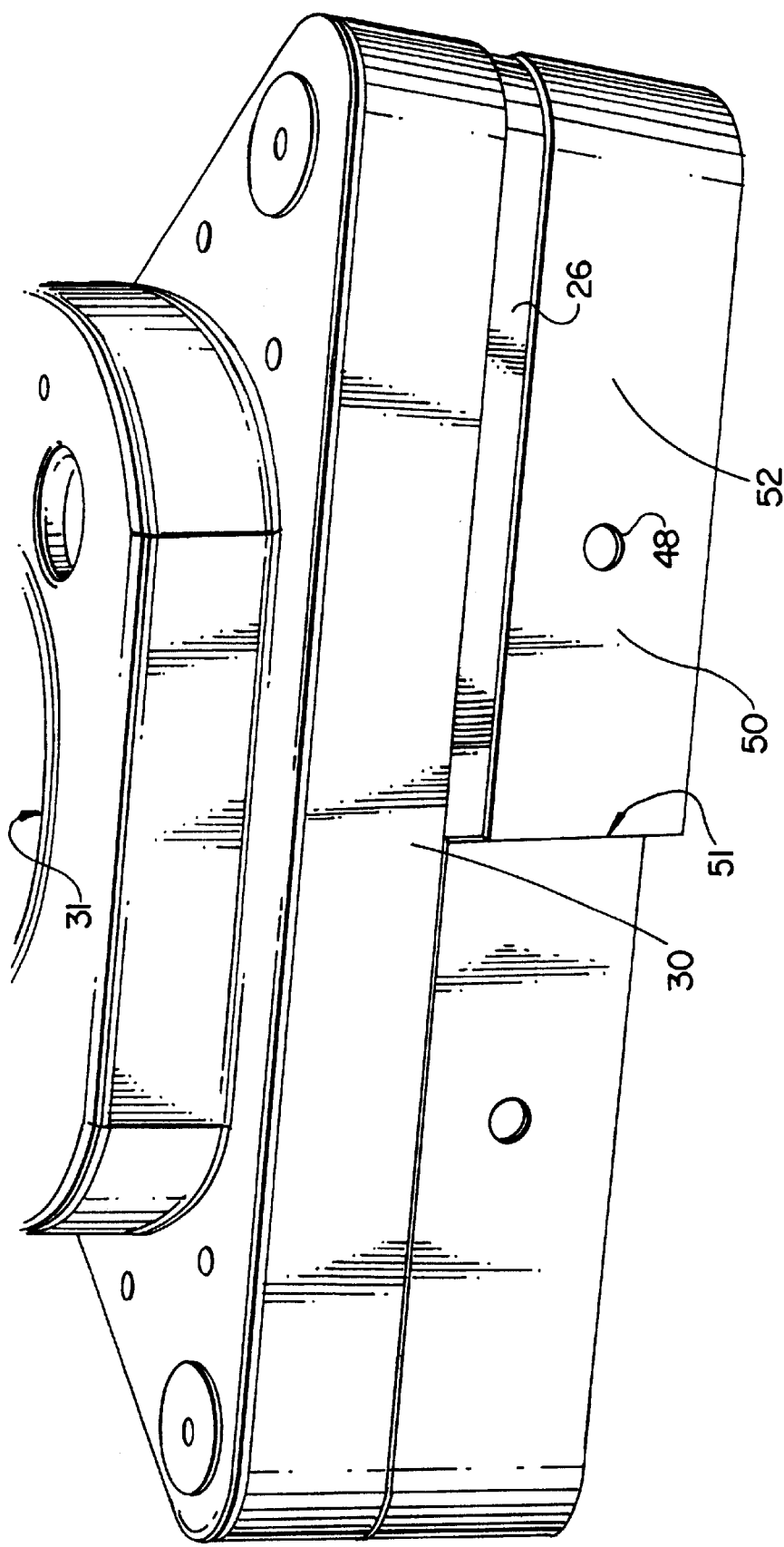
FIG. 2 is a perspective view of the base of the pedestal shown in FIG. 1, with the cable guard plate on the left in the up position, and the cable guard plate on the right in the down position, revealing the side surface of the base plate.
Figure 3:
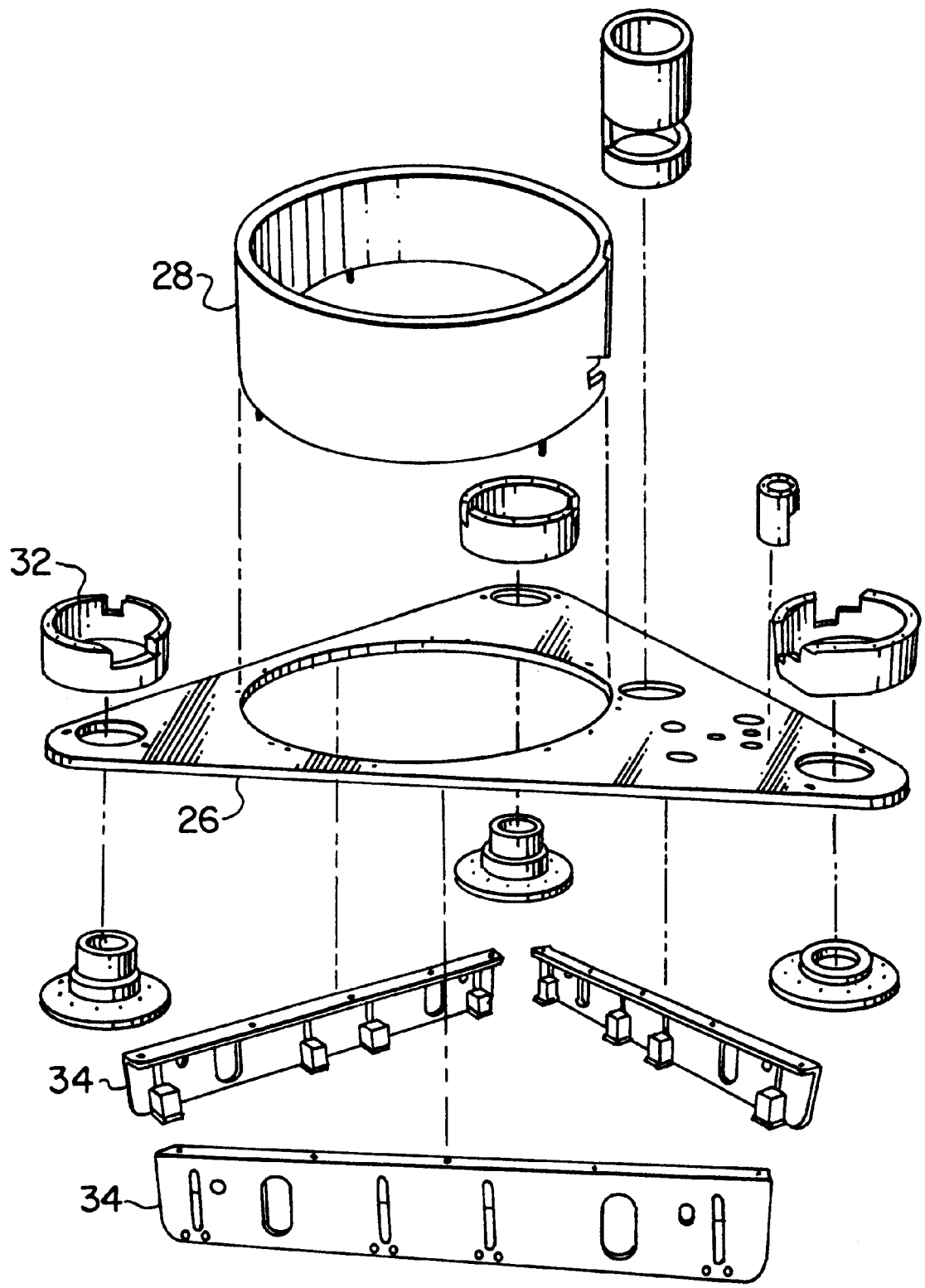
FIG. 3 is an exploded perspective view of the base shown in FIG. 2, with the cover and other components removed, for purpose of illustration.
Figure 4:
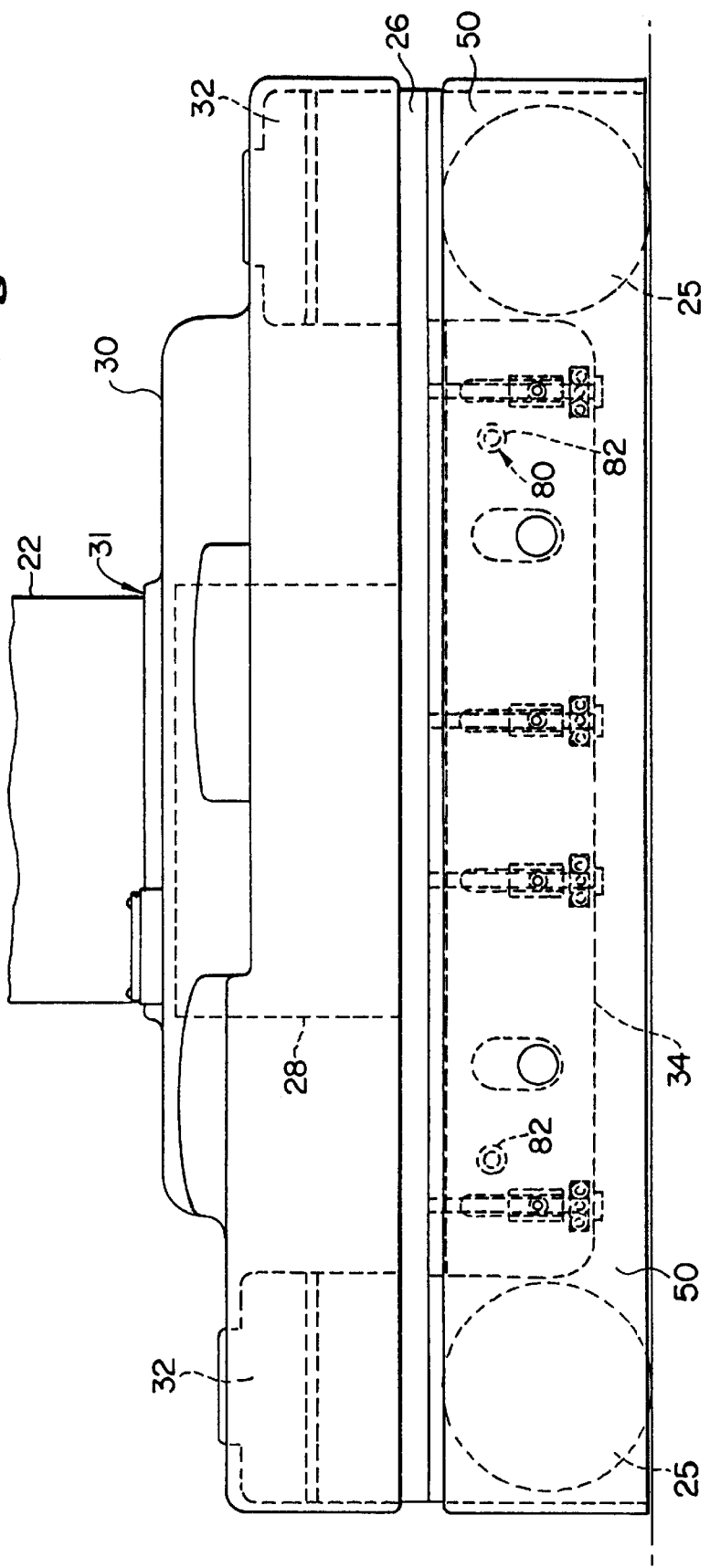
FIG. 4 is side elevation view of the base shown in FIG. 2, with the column removed.

As shown in FIGS. 1–3, a camera pedestal 20 has a column 22 supported on a base 24. The base includes a base plate 26. A column ring 28 is attached, preferably bolted onto, the base plate 26. The column 22 is received into and supported by the column ring 28. A cover 30, preferably molded of plastic, is attached on top of the base plate 26. A column opening 31 in the cover aligns over the column ring 28. The cover is attached to the base plate via locating pins and fasteners 29 on the top surface of the cover threaded into the base plate. The fasteners 29 can be quickly removed and the cover lifted up to access virtually all components needing service or adjustment.

Referring to FIG. 3, the base 24 and base plate 26 are triangular. The sides 27 of the base and base plate are preferably of equal length. The corners of the base and base plate are rounded. The base plate is a flat plate having holes for various components, as shown in FIG. 3. This allows the base plate to be easily manufactured using CNC machines. All components are advantageously bolted onto the base plate. This avoids the disadvantages associated with welding.

A wheel frame assembly 32 is attached to the base plate at each corner. A side plate 34 is, attached along and parallel to each of the sides of the base plate. The three side plates are preferably identical. Referring to FIGS. 3 and 6–9, the side plate 34 has a foot 36 bolted onto the base plate 26, and a flange 38 extending down perpendicular to the foot. Guide slots 40 are provided in the flange 38. A guide post 42 extends vertically from the foot 36 down to a standoff 54 at the lower end of the flange 38, at the guide slot 40. A slide collar 44 surrounds the guide post 42. A bushing, such as a DU or Teflon (Fluorine containing resins) bushing on the slide collar 44 and around the post, provides a smooth, quiet and low friction sliding surface. A stop set screw 46 is threaded through the standoff 54, to adjust the bottom stop position of the slide collar 44 on the guide post 42. Finger holes 48 extend through the flange 38.

A drag set assembly 80 is provided near each end of the side plate 34. The drag set assembly includes a Delrin or similar low friction plastics pad 82 on a plunger. The plunger and pad 82 are biased outwardly and against the back or inside surface of the cable guard plate 50 by a spring 84. The force exerted by the spring to engage the pad 82 against the plate 50 is adjusted with a set screw 86. Consequently, the holding force on the plate 50 is adjusted as desired via the set screws 86. However, the holding force is low enough to allow easy movement of the plate 50 by hand. The pad 82 provides the drag/holding force with little or no slip/stick action, and without creating noise as the plate 50 is moved.

Figure 13:
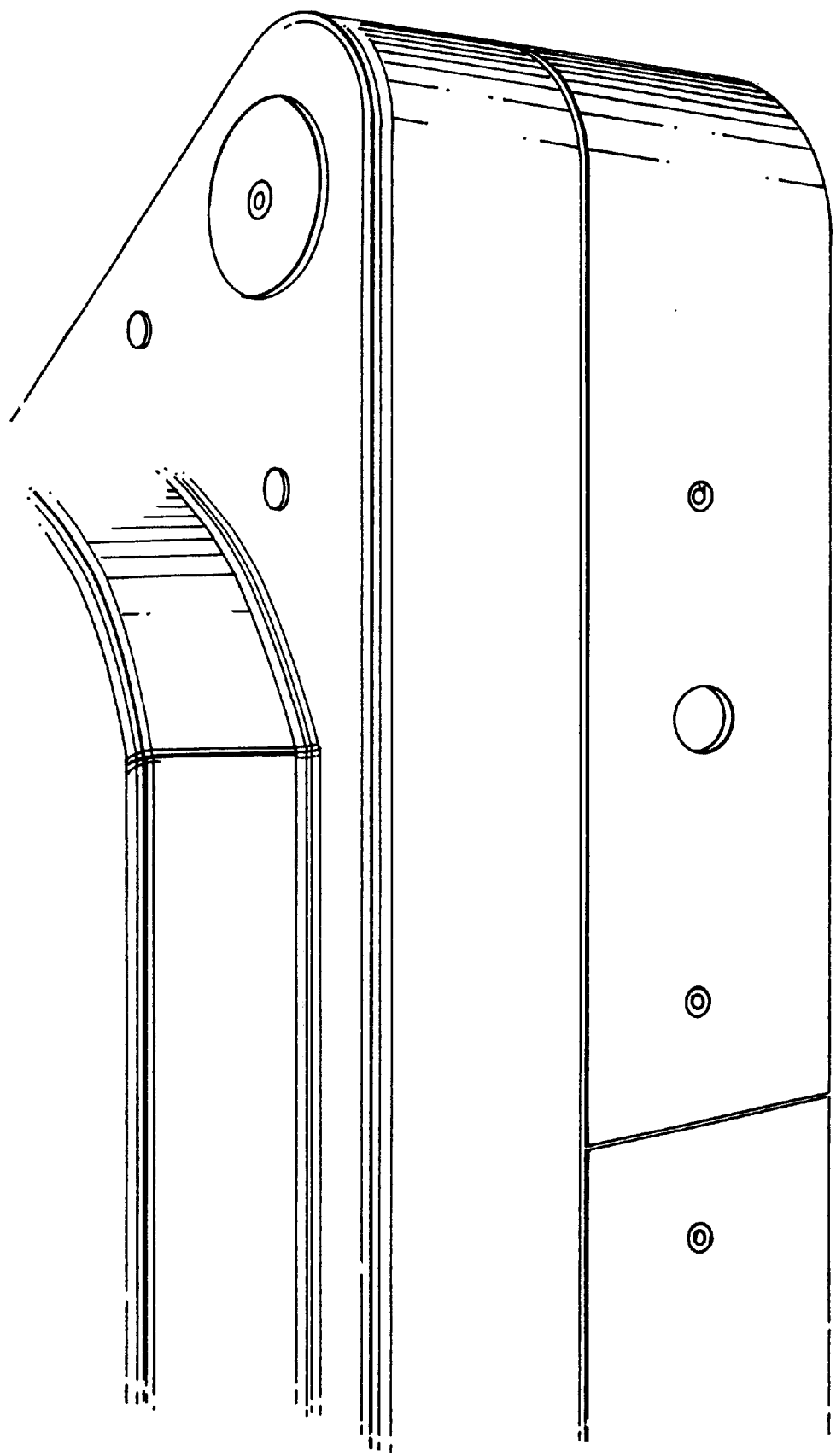
FIG. 13 is a top view of the right corner of the base of the pedestal shown in FIG. 1.

As shown in FIGS. 2, 4, 5, 6 and 9, a cable guard plate 50 is attached to the slide collar 44, preferably using screws 52. The cable guard plate 50 is moveable vertically from an up position, as shown in FIG. 13 wherein the upper edge of the plate 50 contacts the base plate, to a down position, as shown in FIG. 1, by pushing or pulling on the finger hole 48. The cable guard plate 50 may also be put into an intermediate position in between the up and down positions, depending on the amount of ground clearance desired.

Referring to FIG. 6, in the preferred design, with a triangular base, there are three plates 50. Each of the plates 50 starts at about the midpoint of a first side of the base, wraps around a comer, and ends at about the midpoint of an adjacent side of the base. The ends of the plates 50 are separated by a clearance gap 51. Each plate 50 can move up and down independently of the other two plates. As shown in FIG. 2, the plate 50 on the left is up while the plate 50 on the right is down. As shown in FIG. 5, the lower edge 53 of the plate 50 is not flat or parallel to the floor or the base plate. Rather, the lower edge 53 angles or curves up slightly, towards the ends of the plate (which are generally at the midpoint of the sides of the base). Thus, the clearance between the plate 50 and the ground 100 is greater towards the midpoint of the sides of the base than at the comers. This increase in clearance, shown as G in.FIG. 5, preferably ranges from 0.01–0.09 or 0.02–0.04 or about 0.03 inches. The increase in clearance helps to avoid having the lower edge 53 contact the ground 100, if the pedestal rolls over a hump on the ground. As ground clearance adjacent to the corners is fixed by the wheels 25 which are located at the corners, regardless of the ground conditions, no added ground clearance is needed at the corners. The increase in ground clearance away from the corners is achieved by reducing the vertical dimension of the plate 50 towards the ends of the plate. The sides of the base are preferably less than 36, 32 or 28 inches, to allow the pedestal to fit through doorways.

Figure 10:
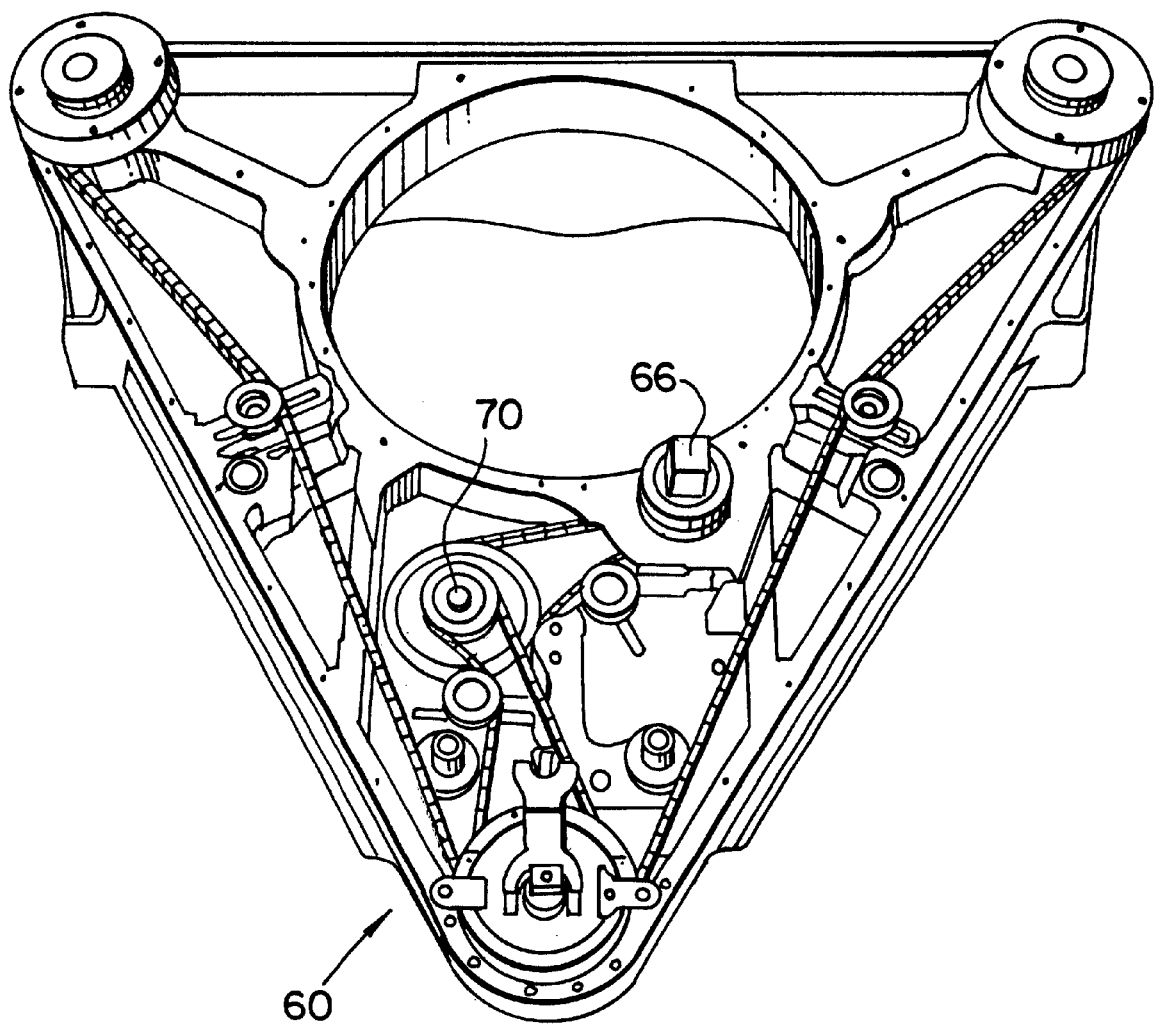
FIG. 10 is perspective view of the steering system of the pedestal of FIG. 1, but with an alternate base chassis.
Figure 11:
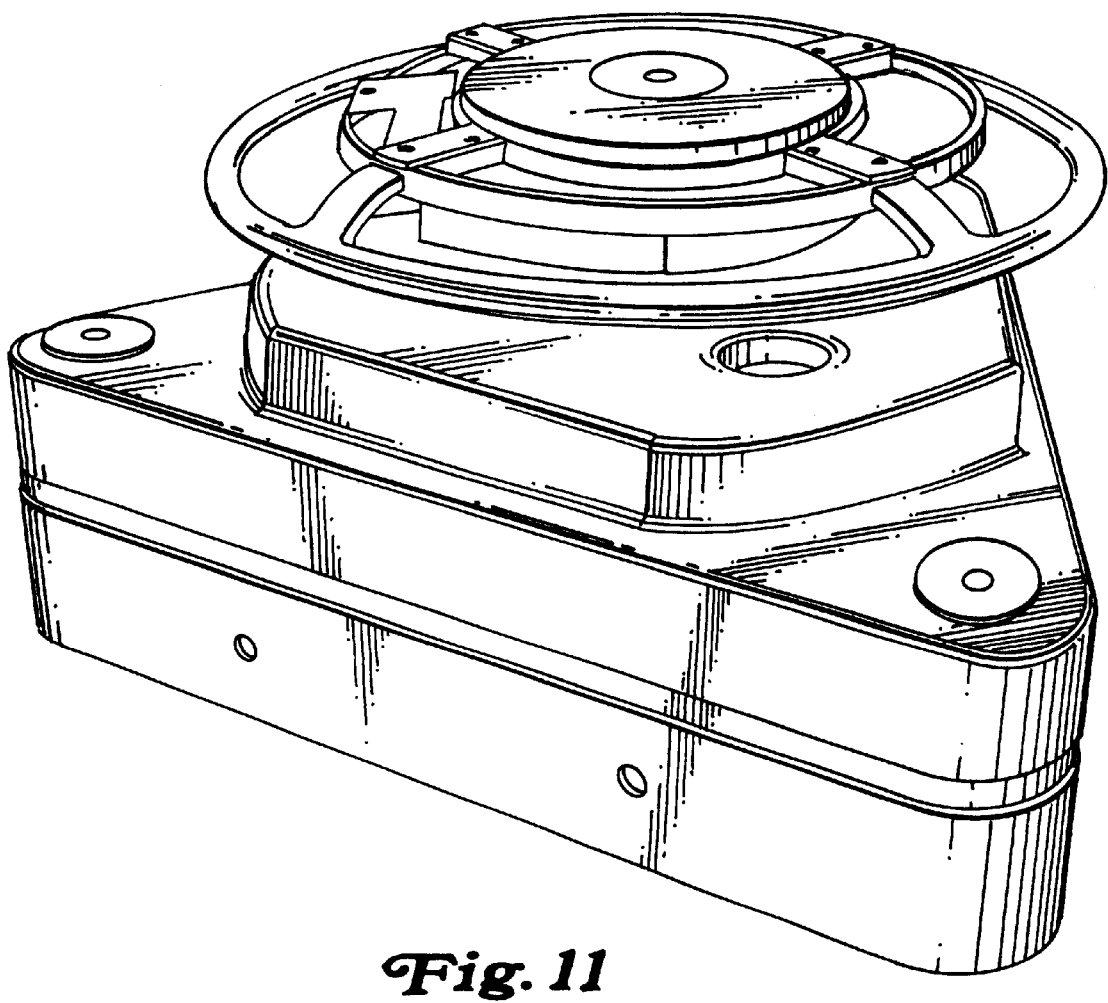
FIG. 11 is a perspective view of the pedestal of FIG. 1 with the column in its lowest position.
Figure 12:
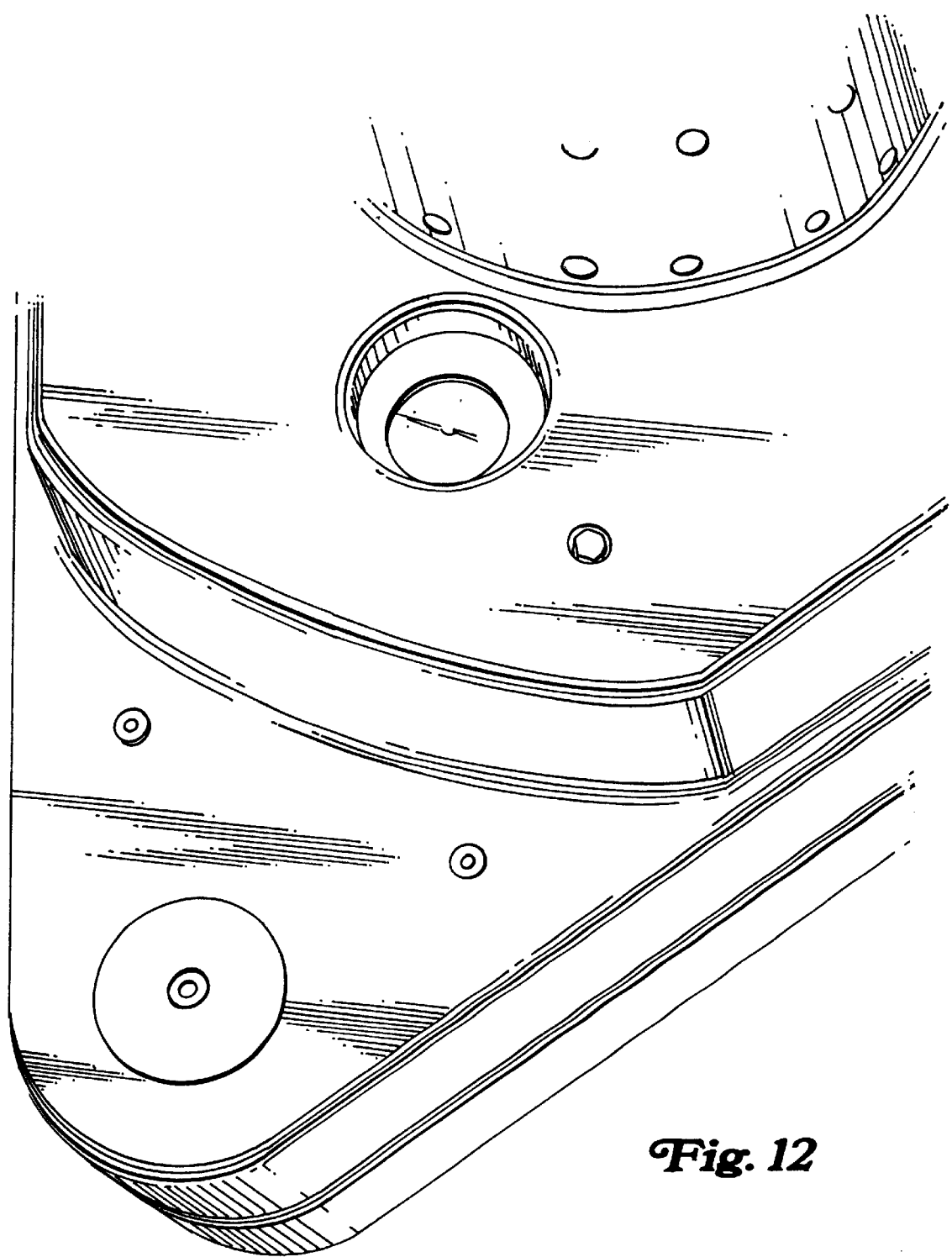
FIG. 12 is a top view of the left corner of the base of the pedestal shown in FIG. 1.

FIG. 10 shows a prior art steering system 60 useful in the pedestal 20. The steering system 60 has crab and conventional steering shift mode pedals 62 and 64, a telescoping drive shaft 66 linked to the steering wheel 68 on the column, a steering shift mode transmission 70, as well as idlers and belts or chains. See U.S. Pat. No. 5,174,593 incorporated herein by reference. The column design and the drive shaft designs are shown in U.S. Pat. Nos. 5,197,700 and 5,176,401, incorporated herein by reference.

Thus, a novel camera pedestal and cable guard system has been shown and described. Many changes and substitutions may of course be made without departing from the spirit and scope of the invention. The invention, therefore, should not be limited, except by the following claims and their equivalents.

What is claimed is:

1. A camera pedestal comprising:

a base;

a plurality of wheels attached to the base;

a column supported on the base and having a camera platform thereon; and a plurality of cable guard plates on the base, with each cable guard plate independently moveable in a vertical direction from a first position to a second position.

2. The pedestal of claim 1 wherein the base is triangular and has first, second and third corners and comprises a wheel at each corner of the triangular base.

3. The camera pedestal of claim 2 wherein the cable guard plate extends along two sides of the triangular base.

4. The camera pedestal of claim 2 with the cable guard plate having a lower edge which is closer to the floor surface at the first corner of the triangular base than at a mid point of a first side of the base extending between the first and second corners.

5. The camera pedestal of claim 2 with the base having three sides of equal length and further comprising a column ring eccentrically located on the base, with the column extending through the column ring.

6. The pedestal of claim 1 wherein in the first position the cable guard plate is spaced apart from a floor surface supporting the pedestal, and in the second position, the cable guard plate is closely adjacent to the floor surface.

7. The camera pedestal of claim 1 further comprising a steering system on a top surface of the base plate.

8. The camera pedestal of claim 7 with the steering system including a transmission and a steering shift mode assembly on the top surface of the base plate.

9. The camera pedestal of claim 1 wherein the cable guard plate is moveable directly by hand.

10. The camera pedestal of claim 1 wherein the base comprises a substantially triangular base plate with a first side plate, a second side plate, and a third side plate extending substantially vertically downward from the three sides of the base plate, respectively.

11. The camera pedestal of claim 10 wherein a first cable guard plate is slidably attached to the first and second side plates near a midpoint of each, a second cable guard plate is slidably attached to the second and third side plates near a midpoint of each, and a third cable guard plate is attached to the third and first side plates near a midpoint of each, wherein each of the first, second, and third cable guard plates wraps around a corner where the two respective side plates to which it is attached meet.

12. The camera pedestal of claim 11 wherein each of the first, second, and third cable guard plates includes a lower edge which is located closer to a floor surface at the corner around which it is wrapped than at the locations on the two side plates to which it is attached.

13. The camera pedestal of claim 1 wherein each of the cable guard plates is separated from two adjacent cable guard plates by a clearance gap.

14. The camera pedestal of claim 1 wherein each of the cable guard plates includes a finger hole therein for facilitating movement of the cable guard plate by hand between the first position and the second position.

15. A camera pedestal comprising:

a base comprising a base plate and three side plates attached to the base plate, and including three cable guard plates, with each cable guard plate slidably attached to two of the side plates and moveable in a vertical direction from a first position to a second position;

a plurality of wheels attached to the base; and a column supported on the base and having a camera platform moveable in a vertical direction.

16. The camera pedestal of claim 15 further comprising a cover attached to the base plate.

17. The camera pedestal of claim 15 further comprising a plurality of guide posts on each side plate, and with a slide collar around each guide post and with the cable guard plate attached to the slide collars.

18. The camera pedestal of claim 17 further comprising a drag assembly on the side plate and engaging against the cable guard plate.

19. The camera pedestal of claim 18 wherein the drag assembly comprises a plastics material pad on a plunger biased by a spring against the side plate, to provide a holding force on the side plate.

20. The camera pedestal of claim 19 further comprising a set screw for adjusting tension in the spring, to allow adjustment of the holding force.

21. A camera pedestal comprising:

a base including a base plate and a plurality of side plates extending substantially vertically downward from the base plate;

a plurality of wheels attached to the base;

a column supported on the base and having a camera platform thereon; and at least one cable guard plate slidably attached to the side plates, with the cable guard plate slidable in a vertical direction from a first position to a second position.

22. The camera pedestal of claim 21 further comprising a plurality of guide posts on each side plate, wherein the cable guard plate is slidably attached to at least two of the guide posts.

23. The camera pedestal of claim 21 wherein the base plate is substantially triangular and three side plates are attached to the base plate, wherein each of three cable guard plates is slidably attached to two of the three side plates.

* * * * *